United States Patent [19]  [11] 4,031,652
Johnson  [45] June 28, 1977

[54] FISHING LINE RELEASE MECHANISM

[75] Inventor: C. Evan Johnson, Onekama, Mich.

[73] Assignee: Hitachi Magnetics Corporation, Edmore, Mich.

[22] Filed: Mar. 15, 1976

[21] Appl. No.: 667,097

[52] U.S. Cl. .............................. 43/43.12; 24/201 B
[51] Int. Cl.² ....................................... A01K 91/00
[58] Field of Search ................. 43/43.12; 24/201 B

[56] References Cited

UNITED STATES PATENTS

| | | | |
|---|---|---|---|
| 3,141,214 | 7/1964 | Bey | 24/201 B |
| 3,816,954 | 6/1974 | Bissonette | 43/43.12 |

Primary Examiner—Louis G. Mancene
Assistant Examiner—Daniel J. Leach

Attorney, Agent, or Firm—Allard A. Braddock

[57] ABSTRACT

A fishing line release mechanism has a permanent magnet positioned within a housing with the poles of the magnet arranged to draw a magnetic release plate toward, or into contact with, the magnet. The release plate has a buttonlike configuration with a central aperture which enables the plate to be threaded by a fishline. When a fishline threaded through the magnetic plate aperture is looped several times around the plate and the plate is then positioned in proximity to the permanent magnet, the line cannot unreel until considerable tension is applied to it. The tension limit can be preset. When the preset limit is reached, the buttonlike magnetic plate springs away from the permanent magnet to release the fishline to further control by the reel.

5 Claims, 4 Drawing Figures

U.S. Patent  June 28, 1977  4,031,652
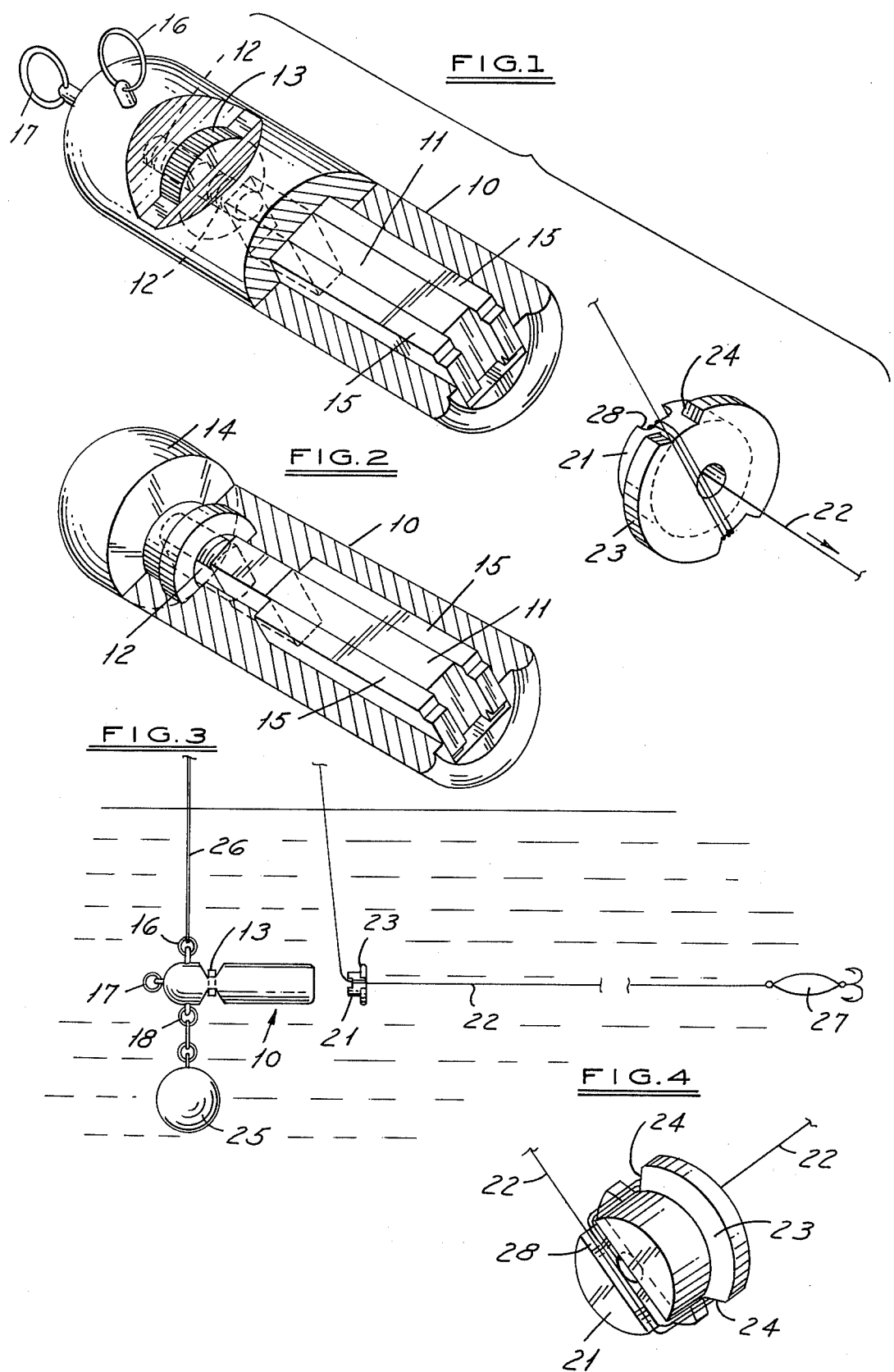

FISHING LINE RELEASE MECHANISM

BACKGROUND OF THE INVENTION

Many fishermen who use a rod and reel prefer not to hold the rod while waiting for the fish to strike. Rod holders have been developed for mounting on a spike which may be pushed into the ground or for mounting on a plate which may be fastened to the deck of a boat. In addition to holding the rod firmly, such rod holders must be able to release the rod quickly after a fish has struck so as to allow the fisherman to take over control during the landing of the fish.

A line release mechanism is also necessary when a rod holder is used. Such a mechanism must maintain sufficient tension on the line to avoid unreeling of the line during an operation such as trolling. However, when a fish strikes and exerts a greater-than-normal pull on the line, the release mechanism must free the line to the control of the reel. A typical release mechanism currently in use consists of a pair of buttons spring-biased toward each other. The line is run between the two buttons and the friction of the buttons against the line holds the line against moderate tension. When a fish bites, the additional pull on the line frees the line from the buttons and control of the line is thereafter exercised through the reel. Care must be taken to avoid cutting or kinking of the line by this type of release and other releases currently available on the market.

SUMMARY OF THE INVENTION

The present invention utilizes a permanent magnet to control the release of a line-release mechanism. The magnet is positioned in a housing where it can attract a buttonlike magnetic plate having a central aperture through which a fishline may be threaded. The fishline is then looped several times around the buttonlike plate which is then placed close to, or in contact with, the permanent magnet. This prevents the line from paying out until the tension on it is increased as by the striking of a fish at a lure attached to the line. When such a strike occurs the increased tension on the line pulls the buttonlike plate away from the permanent magnet and the landing of the fish is then under the control of the reel.

DESCRIPTION OF THE DRAWINGS

FIG. 1 is a cut-away perspective view of the release mechanism of this invention;

FIG. 2 is a cut-away perspective view of an alternative release mechanism with an end-positioned magnet adjustment knob;

FIG. 3 is a partially schematic side view of a downrigger arrangement illustrating the release of the line immediately after the button release plate has been pulled free of the permanent magnet; and FIG. 4 is a perspective view of a button release plate with fishing line wrapped around it preparatory to placing the plate in proximity to the permanent magnet.

DESCRIPTION OF PREFERRED EMBODIMENTS

Referring particularly to FIGS. 1 and 2, the line release mechanism of this invention comprises a housing 10 defining a passageway open at one end in which there is positioned a permanent magnet 11 mounted on a non-magnetic threaded member 12, the magnet 11 and threaded member 12 having axial movement through the passageway when an adjustment nut 13 is rotated (FIG. 1) or an adjustment knob 14 is rotated (FIG. 2). The housing 10 may conveniently be composed of polymeric material but metals may also be used. To avoid any intereference with the operation of the device, it is desirable that any metals used as the housing material be non-magnetic.

On either side of the magnet 11 is a pole piece 15 composed of low carbon steel which may have a protective coating of nickel or other corrosion-resistant material. The pole pieces 15 may be fixedly positioned within the passageway. The magnet 11 may be composed of a wide variety of magnetic material, ceramic magnets being entirely satisfactory, as well as such metal magnets as alnico and cobalt-rare earth. The magnet is designed so that the side facing the passageway opening provides maximum magnetic attraction.

The housing 10 is equipped with side swivels 16 and 18 and a nose swivel 17. These are used for connecting downrigger wires and weights to the release mechanism as will be described with reference to FIG. 3.

Both fastening and releasing of fishline are accomplished by means of a release plate 21 composed of magnetic material. This is a buttonlike member with a central aperture through which a fishline 22 may be threaded. The plate 21 has a flanged portion 23. The flanged portion 23 has two oppositely disposed notches 24 which are used for looping the fishline 22 prior to bringing the plate into a position of proximity or contact with the magnet 11. A diametrically positioned notch 28 extends across the body portion of the release plate 21 between the notches 24. The notches 24 combine with the notch 28 to provide a path for several loops of the fishline 22. This path prevents the looped line from coming into damaging contact with the elements within the housing 10 when the plate 21 is seated within the housing. It will be noted that the flanged portion 23 must be on the side of the plate 21 away from the housing 10. This enables the release to seat against the pole pieces 15 within the housing 10.

The operation of the mechanism will now be described with particular reference to FIGS. 3 and 4. The release device of FIG. 1 is fastened to a downrigger weight 25 by means of the side swivel 18. The side swivel 16 is connected to downrigger wire 26 of a length for trolling to the depth at which the fish are running. A fishing rod with reel (not shown) aboard a trolling craft (not shown) has a release plate 21 threaded on the line 22 with the flanged portion 23 facing a fish lure 27 as shown in FIG. 3. Sufficient line is then paid out to accommodate the depth of the downrigger weight and the trailing distance from the weight to the lure. The line 22 on the side of the release plate 21 opposite the flanged portion 23 is then wound around the plate several times through the notches 24. The release plate is then positioned in proximity or contact with the magnet 11 where magnetic attraction holds it in place with a force (for example, 1½ to 10 pounds) adjusted to the fish being sought by suitable setting of the adjustment nut 13. The outrigger weight 25 is then lowered overboard and trolling is commenced.

A fish striking the lure 27 exerts a pull on the line 22 which in turn exerts a pull on the release plate 21. When this pull exceeds the attractive force of the magnet 11 for the release plate, the plate snaps free and the portion of the fishline 22 looped through the notches 24 and 28 becomes unlooped so that the plate 21 is free to move along the line. Further control of the line is then transferred to the rod and reel aboard the trolling craft.

The release mechanism of this invention is usable not only with the downrigger illustrated in FIG. 3, but with outrigger and surface trolling as well. Where an outrigger is used, the release mechanism is fastened to a pulley line on the outrigger pole so that the mechanism can be set on board the trolling craft and then moved to the outer portion of the outrigger pole. In surface trolling the release mechanism may be fastened to the handle of a fishing rod. For both outrigger and surface trolling the line is paid out to the desired extent and the release plate set in the manner described above with reference to FIG. 3. When a fish strikes, the release mechanism operates in the manner previously described.

While the invention has been described with reference to certain specific embodiments, it is obvious that there may be variations which properly fall within the scope of the invention. Accordingly, the invention should be limited in scope only as may be necessitated by the scope of the appended claims.

What I claim as new and desire to secure by letters patent of the United States is:

1. A fishing line release mechanism comprising: a housing defining an elongated passageway having an open end; a permanent magnet positioned within said passageway having a pole facing said open end; manually adjustable means whereby the magnet is fixedly positionable in different axial positions within said passageway; and a release plate composed of magnetic material positionable within the open end of said passageway, said release plate being attracted to said magnet when positioned within said passageway, said release plate being threadable on a fishline and being movable to a position free of attraction by said magnet when the pull of said fishline is sufficient to overcome the attraction of said magnet for said release plate.

2. A release mechanism as claimed in claim 1 wherein the manually adjustable means is an adjustment nut mounted on a constricted portion of the housing, said nut threadably engaging an axially movable member which engages the permanent magnet.

3. A release mechanism as claimed in claim 1 wherein the manually adjustable means is an adjustment knob positioned at an end of the housing, said knob threadably engaging a member axially movable within the housing, said member engaging the permanent magnet.

4. A release mechanism as claimed in claim 1 wherein the release plate has a circular configuration and an axial threading aperture.

5. A release mechanism as claimed in claim 4 wherein the release plate has a flanged portion at one end, said flanged portion having a set of oppositely disposed notches.

* * * * *